United States Patent
Nakayama et al.

(10) Patent No.: US 7,418,603 B2
(45) Date of Patent: Aug. 26, 2008

(54) MOBILE TERMINAL, CIRCUIT BOARD, CIRCUIT BOARD DESIGN AIDING APPARATUS AND METHOD, DESIGN AIDING PROGRAM, AND STORAGE MEDIUM HAVING STORED THEREIN DESIGN AIDING PROGRAM

(75) Inventors: Takeshi Nakayama, Katano (JP); Yoshiyuki Saito, Katano (JP); Toshiyuki Asahi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 762 days.

(21) Appl. No.: 10/959,987

(22) Filed: Oct. 8, 2004

(65) Prior Publication Data
US 2005/0081049 A1    Apr. 14, 2005

(30) Foreign Application Priority Data
Oct. 9, 2003    (JP)    ............................. 2003-351211

(51) Int. Cl.
*G06F 12/14*    (2006.01)
(52) U.S. Cl. ............................. 713/194; 716/1; 716/4; 716/5; 703/13; 326/41
(58) Field of Classification Search ................. 713/194
See application file for complete search history.

(56) References Cited
U.S. PATENT DOCUMENTS 5,835,781 A    11/1998    Van de Steeg et al.
6,842,862 B2 *    1/2005    Chow et al. .................. 713/190
6,901,343 B2 *    5/2005    Takahashi et al. ........... 702/119
7,054,162 B2 *    5/2006    Benson et al. ............... 361/760
7,219,369 B2 *    5/2007    Hashimoto et al. ............ 726/21
2003/0033108 A1    2/2003    Takahashi et al.
2003/0090883 A1    5/2003    Asahi et al.
2005/0269681 A1    12/2005    Asahi et al.
2006/0101288 A1*    5/2006    Smeets et al. ................ 713/194

FOREIGN PATENT DOCUMENTS

EP    1 010 137    12/2001
EP    1 304 742    4/2003
JP    2002-299842    10/2002

OTHER PUBLICATIONS

European Search Report issued Jan. 31, 2008 in the corresponding European patent application.

* cited by examiner

*Primary Examiner*—Matthew B Smithers
(74) *Attorney, Agent, or Firm*—Wenderoth, Lind & Ponack, L.L.P.

(57) ABSTRACT

The present invention provides a tamper resistant circuit board, an apparatus and method for aiding the design of the circuit board, a computer readable storage medium having stored therein a program for performing the method, and a mobile terminal containing the circuit board. The tamper resistant circuit board has a multilayer structure, including outermost substrates and an internal layer between the outermost substrates, and a signal line through which a confidential signal flows. The signal line is wired such as the confidential signal does not appear on the outer surfaces of the outermost substrates of the multilayer structure of the circuit board.

21 Claims, 8 Drawing Sheets

MOBILE TERMINAL, CIRCUIT BOARD, CIRCUIT BOARD DESIGN AIDING APPARATUS AND METHOD, DESIGN AIDING PROGRAM, AND STORAGE MEDIUM HAVING STORED THEREIN DESIGN AIDING PROGRAM

BACKGROUND OF THE INVENTION

1. Field of the Invention

The present invention relates to a mobile terminal, a circuit board, a circuit board design aiding apparatus and method, a design aiding program, and a storage medium having stored therein the design aiding program. More particularly, the present invention relates to a tamper-resistant circuit board, an apparatus and method for aiding the design of the circuit board, a computer-readable storage medium having stored therein the program for performing the method, and a mobile terminal containing the circuit board.

2. Description of the Background Art

In recent years, with the development of digital information technologies and the explosive popularization of digital information communication infrastructure, it has become more common to process digital content such as music, images, video, and games, as digital information. The content converted into digital information is vulnerable to fraudulent acquisition by communications interception, wiretapping, spoofing, or the like, and fraudulent activities such as illegal copies and illegal modification of storage media having stored therein the data of the content. Thus, it is a great challenge to establish security systems for protecting the rights of content copyright holders and the profits of content distributors. Accordingly, techniques are required which protect copyrighted works converted into digital information. Note that in the following description, the difficulty of gaining unauthorized access to confidential information, such as content and signals, is referred to as "tamper resistance".

For security techniques for improving tamper resistance by communication media, there have been various known techniques. In most of the techniques, tamper resistance is improved by identifying authorized systems or encrypting data using encryption/authentication techniques. A representative of the techniques includes a challenge-response mutual authentication technique in which upon accessing a confidential-data storage region where confidential data which requires the protection of copyrighted works is stored, random numbers and response values are exchanged between apparatuses to mutually authenticate each other's validity and only a valid access is permitted. In communication of confidential data, encryption communication is performed which uses random numbers or response values for mutual authentication, thereby preventing unauthorized decoding.

One of the conditions for improving the tamper resistance of a circuit board in which components and the like are installed and connected by wiring, is the difficulty of probing a signal line which transmits digital information. This is because the information converted into a digital signal can be easily reproduced with the same quality as the original only if the signal is probed and the logic of the signal is determined. The harder it is to read a signal on the circuit board, i.e., the harder it is to perform probing, the harder it gets to analyze or copy digital information by external unauthorized access, and the easier it is to perform probing, the easier it gets to extract a signal, and thus it becomes easy to analyze or copy digital information.

For security techniques for circuit boards, there have also been various known techniques. For example, there is a technique in which the circuit section where confidential information is processed is formed in a one-chip IC format so that a signal of the confidential information cannot flow on the circuit board. In addition, there is a technique in which the circuit section where confidential information is processed is covered by a resin or the like. Further, there is a technique in which a component is arranged to cover a probeable portion of a signal line through which a signal of confidential information flows (see Japanese Laid-Open Patent Publication No. 2002-299842).

However, in the method in which the circuit section where confidential information is processed is formed in a one-chip IC format or covered by a resin or the like, problems arise that off-the-shell ICs cannot be used, all the chips and wiring on the circuit board need to be taken care of, and the like. Thus, such methods are impractical in terms of the current techniques and manufacturing costs. In addition, after the circuit section is formed in a one-chip IC format or covered by a resin, not only third parties but also a developer or designer (hereinafter referred to as a "designer or the like") is unable to verify a confidential signal. Further, to adopt conventional encryption/authentication techniques for communication in circuit boards, a logic for realizing the techniques needs to be incorporated in all LSIs handling digital information. Thus, the adoption of such techniques is also impractical in terms of the current techniques and manufacturing costs. Moreover, the method in which a signal line for confidential information is covered by a component, as in the case of Japanese Laid-Open Patent Publication No. 2002-299842, is problematic because probing can be easily done by removing the component. As described above, with the conventional techniques, it is very difficult to completely conceal a signal line of the circuit board, through which confidential information flows.

SUMMARY OF THE INVENTION

Therefore, an object of the present invention is to provide a circuit board in which tamper resistance is improved by making probing by third parties difficult, while solving problems associated with the current techniques and manufacturing costs. Another objective of the present invention is to provide a design aiding apparatus and method for such a circuit board, a design aiding program, and a storage medium having stored therein the design aiding program.

The present invention is directed to a circuit board having a multilayer structure which enables components to be contained in an internal layer between substrates. To achieve the objective mentioned above, in the circuit board of the present invention, a signal line through which a predetermined confidential signal flows is wired such that the confidential signal does not appear in an observable manner on a surface of the circuit board. The circuit board is suitable for use in mobile terminals such as mobile phones and PDAs, for example.

In the circuit board, in order to ensure tamper resistance and to allow a particular user such as the designer or the like to freely extract a confidential signal, it is preferred that an external access component configured to connect between the signal line and a predetermined observation point provided on the surface of the circuit board be contained in the internal layer, and that a particular user be allowed to observe and control the confidential signal through the external access component.

The external access component may have an encryption function to perform a predetermined encryption on the confidential signal and output the encrypted confidential signal to the observation point. In this case, the particular user may observe and control the encrypted confidential signal by decoding a cipher provided to the signal which appears at the observation point. In the case where there are a plurality of confidential signals, the confidential signals may be classified by a predetermined classification method and different types of encryption may be performed on the classified confidential signals. The encryption function may involve a scrambling engine. In the case where there are a plurality of confidential signals, the encryption function may involve a plurality of scrambling engines which are performed in accordance with the number of classifications.

Alternatively, the external access component may have a fast interface function which enables a fast sampling of the confidential signal, and compress the confidential signal and output the compressed confidential signal to the observation point. The external access component may have an output selection function which allows the user to select, upon shipment of the circuit board, an output mode or a non-output mode of the confidential signal to the observation point. The external access component may be a zero ohm resistor or a signal-transmitting component. The output mode may be set by mounting the external access component on the circuit board, and the non-output mode may be set by dismounting the external access component from the circuit board. The external access component may have a debug function for debugging the components installed in the circuit board, and may allow the user to select, upon shipment of the circuit board, one of mounting and dismounting of the external access component. In this case, the external access component may perform a predetermined encryption on a debug signal for observing and controlling operations of the components and output the encrypted debug signal to the observation point.

In order to completely ensure tamper resistance without taking into account the extraction of a confidential signal by a particular user, it is preferred that at least one selected from the group consisting of a component configured to input the confidential signal and a component configured to output the confidential signal be contained in the internal layer. In the case where a component configured to input or output the confidential signal is installed in the circuit board with a connection terminal thereof being concealed, the component configured to input the confidential signal or output the confidential signal may be arranged on the surface of the circuit board by establishing a connection with the signal line through a via.

The present invention is also directed to a design aiding apparatus for aiding a design of a circuit board having a multilayer structure which enables components to be contained in an internal layer between substrates. To attain the objective mentioned above, the design aiding apparatus of the present invention comprises: a basic configuration including a detection section; an arrangement section; and a wiring section; and an additional configuration including a check section.

The detection section detects a confidential signal based on predetermined information necessary to design the circuit board. The arrangement section arranges in the internal layer a component having a predetermined package among a component configured to input the detected confidential signal and a component configured to output the detected confidential signal, and designs a circuit. The wiring section wires a signal line through which the detected confidential signal flows in the internal layer and designs the circuit. The check section checks whether the circuit having been subjected to the arrangement section and the wiring section is designed in such a manner that the confidential signal does not appear in an observable manner on a surface of the circuit board, and outputs a predetermined warning if the circuit is not designed in the manner. It is preferred that the component having the predetermined package be a component whose connection terminal is concealed during installation in the circuit board.

The processes performed by the detection section, arrangement section, wiring section, and check section of the above-described design aiding apparatus can be taken as a design aiding method which provides a series of processing steps. Specifically, the design aiding method is such that in a design aiding apparatus, a confidential signal is detected based on predetermined information necessary to design the circuit board; a component having a predetermined package among a component configured to input the detected confidential signal and a component configured to output the detected confidential signal is arranged in the internal layer, and a circuit is designed; a signal line through which the detected confidential signal flows is wired in the internal layer and the circuit is designed; it is checked whether the circuit having been designed by arranging the component and wiring the signal line is designed in such a manner that the confidential signal does not appear in an observable manner on a surface of the circuit board; and if the circuit is determined not to be designed in the manner, a predetermined warning is outputted.

Preferably, the design aiding method is provided in the form of a program for causing a design aiding apparatus to perform a series of processing steps. The program may be stored on a computer-readable storage medium.

According to the present invention, the circuit board has a structure in which a signal line through which a confidential signal requiring tamper resistance flows, components associated with the input and output of the confidential signal, and an external access component are all contained in an internal layer. The encrypted confidential signal is outputted to a surface of the circuit board. With this structure, probing by third parties becomes difficult, and accordingly, tamper resistance can be improved, while ensuring the observationality and controllabilityby the designer or the like. In addition, by shipping the circuit board without the external access component being mounted, a complete tamper resistance is achieved. Further, since the encryption used for the circuit board of the present invention is different from that used for conventional integrated circuits, any commercially available component and an encryption component can be combined, thereby providing an advantageous effect that a circuit board having tamper resistance can be developed at low cost.

In addition, according to the present invention, the circuit board has a structure in which a signal line through which a confidential signal requiring tamper resistance flows and components, among components associated with the input and output of the confidential signal, whose signal terminals are exposed on a surface of the circuit board upon placement, are all contained in an internal layer so that the confidential signal is not exposed on the surface of the circuit board. This arrangement makes probing by third parties difficult and, accordingly, tamper resistance can be improved. Further, these circuit boards with improved tamper resistance can be easily designed using the above-described design aiding apparatus and method. In addition, even if the design has not been made properly, since a warning is issued to the designer or the like, a circuit board design error can be avoided.

These and other objects, features, aspects and advantages of the present invention will become more apparent from the following detailed description of the present invention when taken in conjunction with the accompanying drawings.

DESCRIPTION OF THE PREFERRED EMBODIMENTS

A circuit board having improved tamper resistance of the present invention is fabricated using a multilayer substrate technique which enables components to be contained in an internal layer between substrates. With reference to the drawings, the characteristic circuit board structure of the present invention will be described below.

First Embodiment

A circuit board according to a first embodiment of the present invention has a structure in which a signal line for a signal requiring tamper resistance, such as confidential signal, is wired in an internal layer and a designer or the like is allowed to observe or control the signal when necessary.

Figure 1:
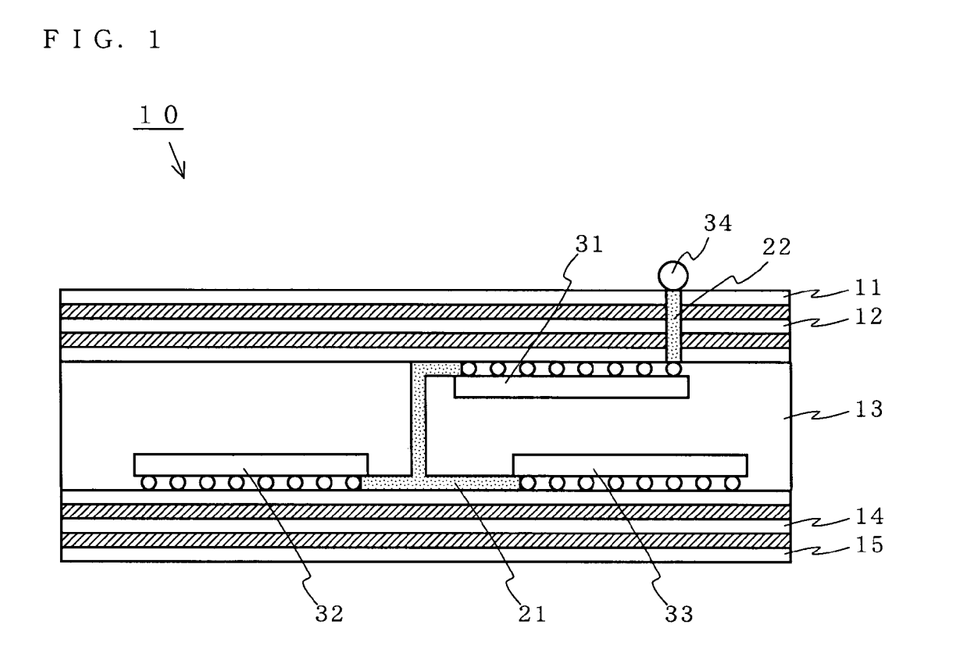
FIG. 1 is a cross-sectional view of a circuit board 10 having a substrate structure according to a first embodiment of the present invention.

FIG. 1 is a cross-sectional view of a circuit board 10 having a substrate structure according to the first embodiment of the present invention. As shown in FIG. 1, the circuit board 10 includes an upper outermost substrate 11, an upper multilayer substrate 12, a component-containing layer 13, a lower multilayer substrate 14, and a lower outermost substrate 15. The component-containing layer 13 contains therein components 31, 32, and 33. In FIG. 1, a signal line 21 which interconnects between the components 31, 32, and 33 serves as a signal line through which a signal requiring tamper resistance flows. The signal requiring tamper resistance includes, for example, a signal that a circuit board designer of a memory bus, a debugging signal line, etc. of a microcomputer, does not want third parties to observe or control. This signal is hereinafter referred to as a "confidential signal". The signal line 21 does not appear on the outer surfaces of the upper substrate 11 and the lower substrate 15 of the circuit board 10 as a foil or a via, and is wired only within the component-containing layer 13. In addition, the signal line 21 is connected, through the component 31 and a via 22, to an observation point 34 exposed on the upper substrate 11 of the circuit board 10. The observation point 34 is used to establish an external connection with a test pad, a test pin, a connector, or the like.

The component 31 of the circuit board 10 according to the first embodiment is a component for controlling the connection between the signal line 21 and the observation point 34, i.e., an external access component. By allowing the component 31 to have various functions such as those described later, various tamper resistances can be realized.

1. Encryption Function

Figure 2:
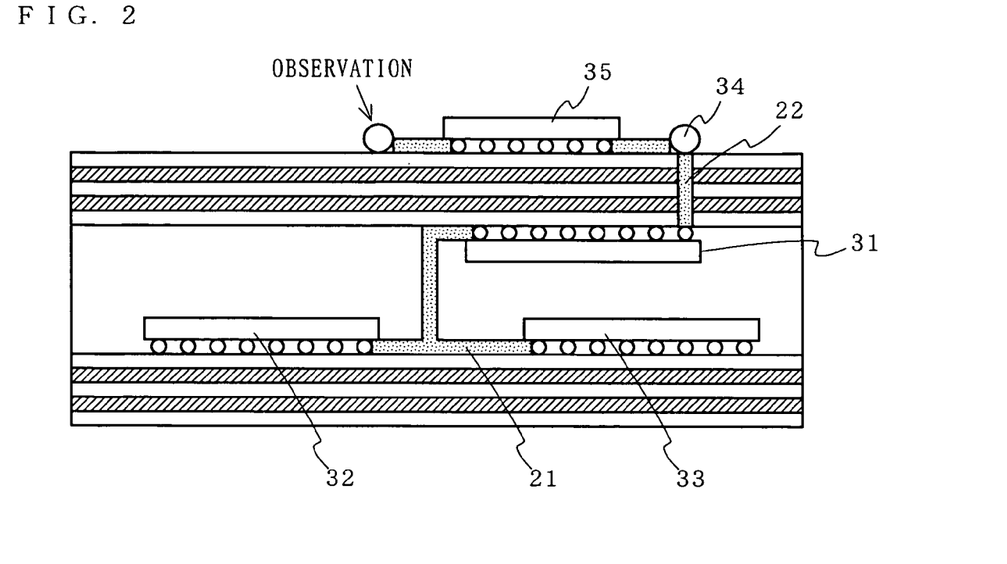
FIG. 2 is a cross-sectional view of the circuit board 10 in which a decoding component 35 is connected to an observation point 34.
Figure 3:
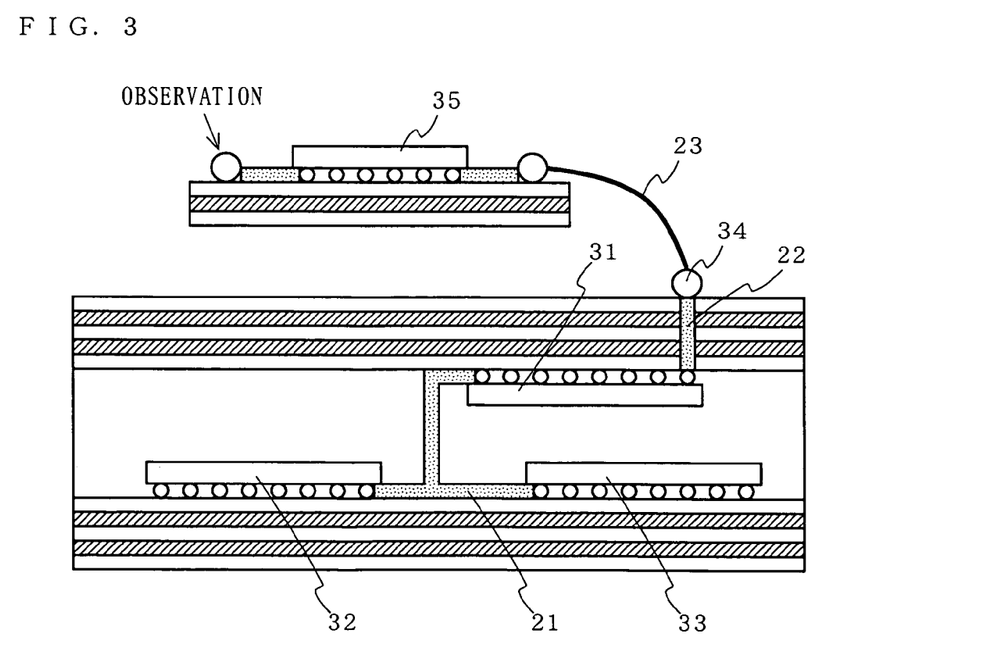
FIG. 3 is another cross-sectional view of the circuit board 10 in which the decoding component 35 is connected to the observation point 34.

By using a component 31 having an encryption function such as a scramble engine, a confidential signal flowing through the signal line 21 can be provided with a predetermined cipher (scramble) and outputted to the observation point 34. Thus, even if the observation point 34 is probed, the confidential content cannot be read unless the cipher provided to the observed signal is decoded. Accordingly, only the designer or the like who knows the cipher system is allowed to freely observe or control a confidential signal, thereby improving tamper resistance to third parties. Note that the cipher may be decoded by connecting a decoding component 35 to the observation point 34. For example, the decoding component 35 may be installed in a predetermined location on the circuit board 10 (see FIG. 2), or the decoding component 35 installed on another substrate may be externally connected to the observation point 34 using a cable 23 or the like (see FIG. 3).

In the case where there are a plurality of confidential signals, one type of encryption may be performed on all confidential signals using a single encryption function, or different types of encryption may be performed on pre-classified confidential signals using two or more encryption functions. By thus using plural types of encryption, probing by third parties becomes more difficult and accordingly an improvement of tamper resistance can be expected.

2. Fast I/F Function

In the case where there are a plurality of confidential signals, there may be a need to provide the same number of observation points 34 as the number of the confidential signals. In this case, a component 31 is used which operates in a shorter period than the period of a confidential signal flowing through the signal line 21 and which has a fast interface (I/F) function of converting a signal to be inputted from parallel to serial. This enables a confidential signal flowing through the signal line 21 to be rapidly sampled in accordance with the period of the confidential signal, compressed, and outputted, whereby the number of observation points 34 exposed outside can be reduced. Accordingly, the area occupied by the observation points with respect to the area of the circuit board can be reduced, making it possible to reduce the manufacturing cost of the circuit board.

3. Output Selection Function

In the case where the observation or control of a confidential signal needs to be performed only before product shipment, a component 31 having an output selection function may be used. The component 31 may typically be a switch for switching between connection and non-connection, but may also be a jumper component such as a zero ohm resistor or a signal-transmitting component such as a bus buffer. In the case where the component 31 is the former, the component 31 is switched to a connection mode only when the observation or control of a confidential signal needs to be performed, and ultimately the circuit board 10 is shipped with the component 31 being switched to a non-connection mode. In the case where the component 31 is the latter one, the component 31 is arranged and connected to the circuit board 10 only when the observation or control of a confidential signal needs to be performed, and ultimately the circuit board 10 is shipped without the component 31 being mounted thereon. In this manner, the signal line 21 can be concealed in an internal layer of the circuit board 10 and, thus, a complete tamper resistance to third parties is achieved. Note that a component having an encryption function or a fast I/F function may also not necessarily be mounted on the circuit board upon shipment.

4. Debug Function

In the case where the observation or control of a confidential signal needs to be performed only before production shipment, a component 31 having a debug function may be used. For example, the debug function is such that the signal line 21 is monitored, and if a trigger occurs in an address, data, or the like which is pre-specified by a designer or the like, the state of the address, data, or the like before and after the occurrence of the trigger is stored in a memory within the component 31. The designer or the like can later observe the content of the memory. Alternatively, the debug function is such that the signal line 21 is monitored, and if a trigger occurs in an address, data, or the like which are pre-specified by a designer or the like, operations of necessary components such as the components 32 and 33 are stopped. The operations later are resumed (and re-stopped) in accordance with an instruction from the designer or the like. A circuit board 10 may be developed with the component 31 having the debug function installed thereon, and ultimately the circuit board 10 may be shipped without the component 31 being mounted thereon. In this manner, the signal line 21 can be concealed in an internal layer of the circuit board 10 and thus a complete tamper resistance to third parties is achieved.

Note that the component 31 may be provided with both the encryption function and the debug function. The use of such a component 31 provides an advantageous effect that the designer or the like can develop a circuit board without worrying about a signal delay caused by encryption.

Figure 4:
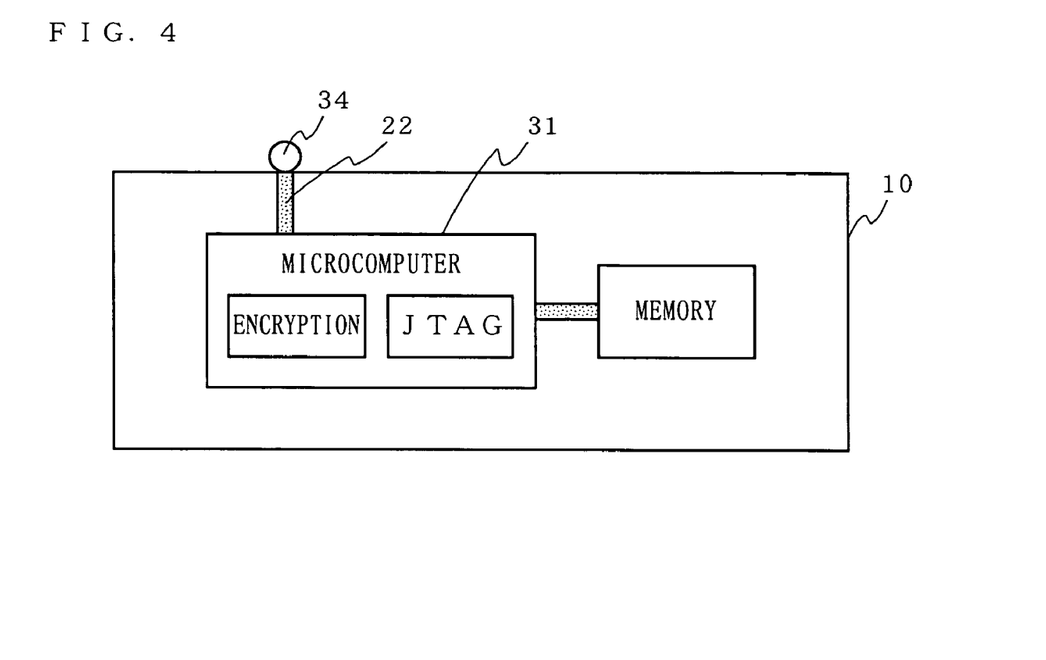
FIG. 4 is a diagram showing an exemplary component to be contained in a component-containing layer 13.
Figure 5:
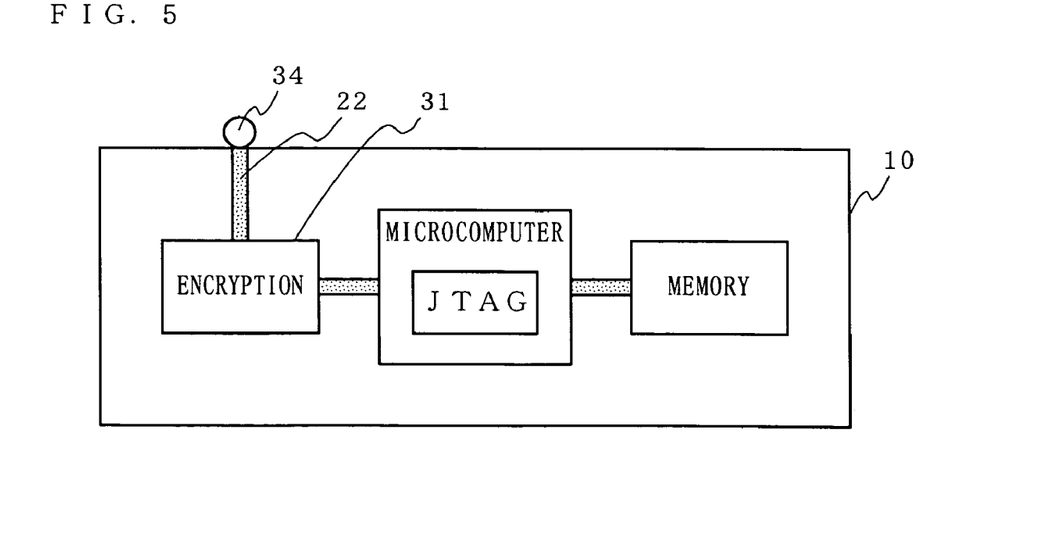
FIG. 5 is another diagram showing an exemplary component to be contained in the component-containing layer 13.

Further, in addition to the encryption function, the component 31 may be provided with a microcomputer function of controlling a part of the circuit board 10 and a microcomputer debug function (such as the JTAG (Joint Test Action Group) shown in FIG. 4. By using such a component 31, debug information of the microcomputer can be encrypted and outputted to the observation point 34, thereby providing an advantageous effect such as an improvement of tamper resistance. As shown in FIG. 5, an encryption function section and a section including the microcomputer function and the microcomputer debug function may be independent components.

As described above, the circuit board according to the first embodiment of the present invention has a structure in which a signal line through which a confidential signal requiring tamper resistance flows, components associated with the input and output of the confidential signal, and an external access component are all contained in an internal layer, and the encrypted confidential signal having is outputted to the surface of the circuit board. With this structure, probing by third parties becomes difficult and accordingly tamper resistance can be improved, while ensuring the observationality and controllability by the designer or the like. In addition, by shipping the circuit board without the external access component being mounted, a complete tamper resistance is achieved. Further, since the encryption used for the circuit board of the present invention is different from that used for conventional integrated circuits, any commercially available component and an encryption component can be combined, thereby providing an advantageous effect that a circuit board having tamper resistance can be developed at low cost.

Note that the circuit board 10 shown in FIG. 1 is merely one example. Thus, the configuration of internal layers of the circuit board is not limited to one comprising the upper multilayer substrate 12, the component-containing layer 13, and the lower multilayer substrate 14, and can be freely defined as long as components can be contained in an internal layer. For example, all internal layers may be allowed to serve as component-containing layers, or a multilayer substrate and a component-containing layer may be combined alternately.

Second Embodiment

A circuit board according to a second embodiment of the present invention has a structure in which a signal line for a confidential signal is wired in an internal layer and components whose terminals are exposed, such as a two-terminal component and a QFP (Quad Flat Package) component, are arranged in the internal layer.

Figure 6:
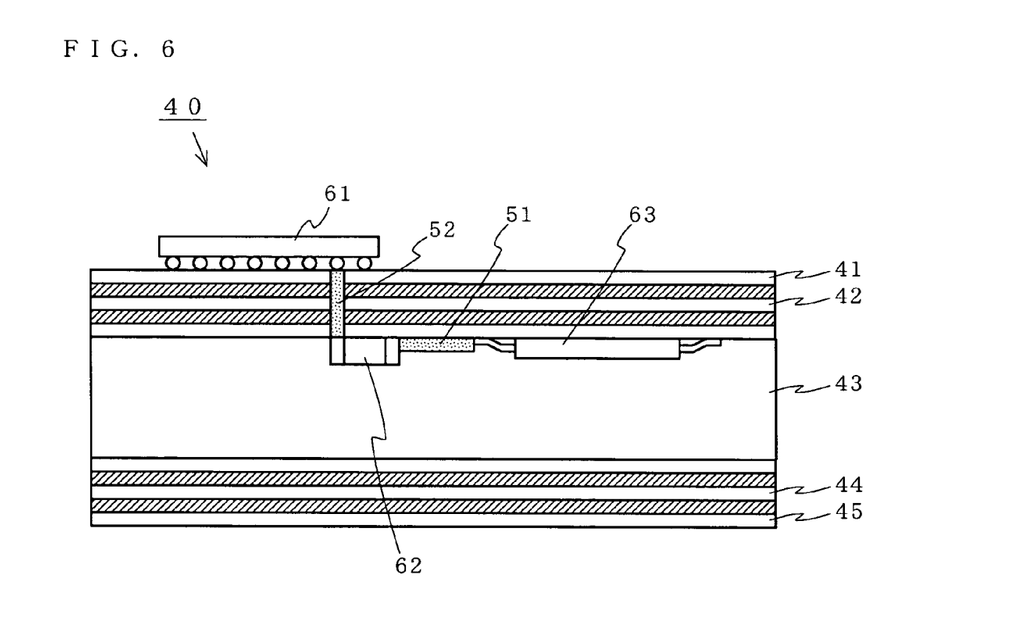
FIG. 6 is a cross-sectional view of a circuit board 40 having a substrate structure according to a second embodiment of the present invention.

FIG. 6 is a cross-sectional view of a circuit board 40 having a substrate structure according to the second embodiment of the present invention. As shown in FIG. 6, the circuit board 40 includes an upper substrate 41, an upper multilayer substrate 42, a component-containing layer 43, a lower multilayer substrate 44, and a lower substrate 45. A component 61 is placed on the upper substrate 41. The component-containing layer 43 contains therein components 62 and 63. In FIG. 6, a signal line 51 for connecting between the components 62 and 63 serves as a signal line through which a confidential signal requiring tamper resistance flows. The signal line 51 is connected to the component 61 through a via 52.

The component 61 placed on the upper substrate 41 of the circuit board 40 according to the second embodiment is a component such that its signal terminal is not exposed on the surface of the circuit board 40 upon placement, i.e., a component that cannot be probed. For example, the component 61 comes in a BGA (Ball Grid Array) package or the like. Components whose signal terminals are exposed on the surface of the circuit board 40 upon placement, such as the components 62 and 63, are all arranged in the component-containing layer 43. In this configuration, a confidential signal requiring tamper resistance which flows through the signal line 51 does not appear outside unless the component 61 is removed from the circuit board 40.

As described above, in the circuit board according to the second embodiment of the present invention, a signal line through which a confidential signal requiring tamper resistance flows and components, among components associated with the input and output of the confidential signal, whose signal terminals are exposed on a surface of the circuit board upon placement, are all contained in an internal layer so that the confidential signal is not exposed on the surface of the circuit board. This makes probing by third parties difficult and accordingly tamper resistance can be improved.

Third Embodiment

A third embodiment of the present invention will describe an example where the substrate structures described in the foregoing first and second embodiments are used in mobile terminals such as mobile phones and PDAs.

Figure 7A:
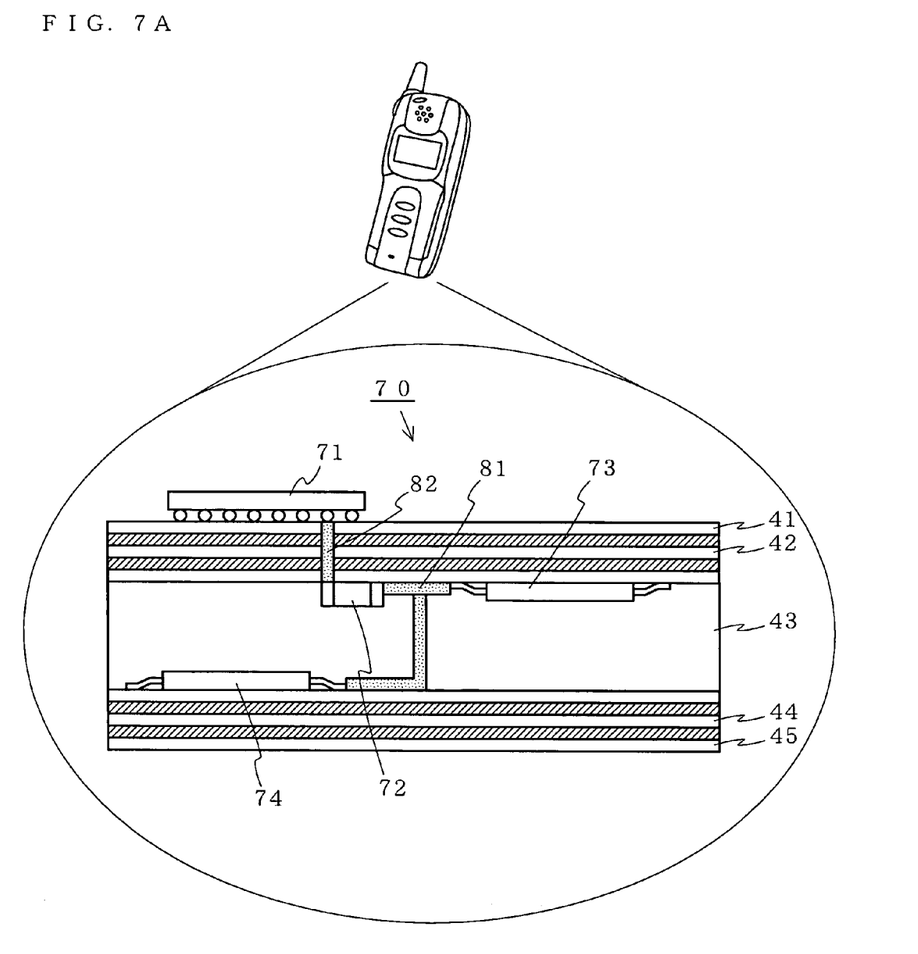
FIG. 7A is a cross-sectional view of a circuit board 70 according to a third embodiment of the present invention.
Figure 7B:
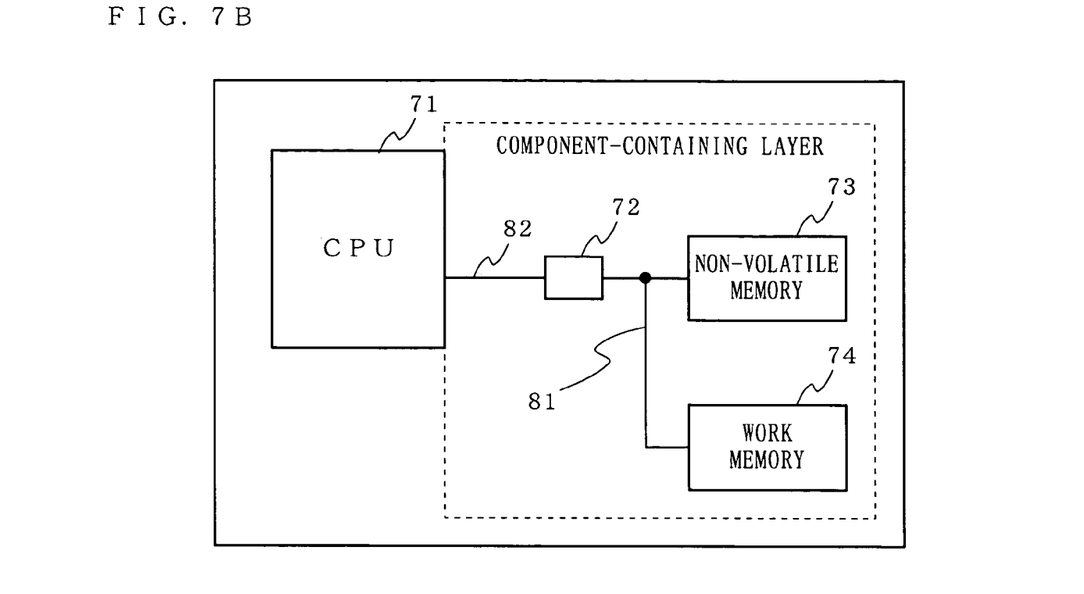
FIGS. 7B and 7C are diagrams each showing an exemplary component to be contained in a component-containing layer 43.

As is commonly known, a mobile phone has personal information about the user and other people, a password, and the like stored therein. These personal information and password are confidential information that the user does not want third parties to see, and thus preferably have tamper resistance to fraudulent activities. In view of this, a mobile phone may use a circuit board in which a memory component where confidential information is stored and a signal line through which a signal regarding the confidential information flows are all contained in an internal layer of the circuit board. FIGS. 7A and 7B are diagrams showing a specific example of the above-described configuration. Specifically, a non-volatile memory 73 (flash memory) where confidential information is stored, a work memory (SRAM) 74 used to process the confidential information, a signal line 81 through which a signal regarding the confidential information flows, and a dumping resistor 72 are contained in a component-containing layer 43 and a CPU 71 is provided on an upper substrate 41. Needless to say, which components and signal lines should be contained in the internal layer 43 vary depending on the processing circuit of a mobile phone or the signal handled as confidential information.

Figure 7C:
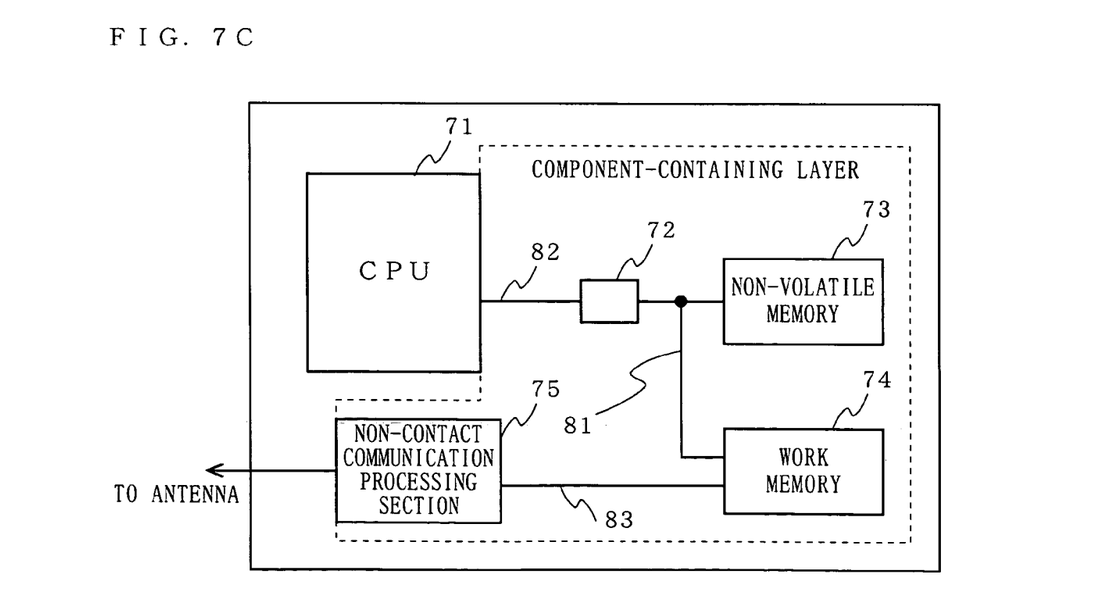

In recent years, systems have been gradually put to practical use in which the payment of money or the like is made using a non-contact communication function which is installed on mobile phones, IC cards, or the like. The systems include, for example, the ICOCA™ rechargeable contact less card system conducted by JR West. In the ICOCA™ systems, the payment of money, a charge, or the like is made only by data communication, and thus the tamper resistance becomes particularly important for mobile phones or the like having installed therein the systems, so as to avoid monetary damages. In view of this, mobile phones or the like having installed therein such systems may use a circuit board in which a non-contact communication processing section (or a memory having stored therein a processing program) 75 and a signal line 83 which is connected to the non-contact communication processing section 75 are contained in an internal layer of the circuit board, as well as a memory component where confidential information is stored and a signal line through which a signal regarding the confidential information flows. FIG. 7C is a diagram showing a specific example of such a configuration.

As described above, by adopting the above-described substrate structure in circuit boards used for mobile terminals such as mobile phones and PDAs, probing by third parties becomes difficult and accordingly tamper resistance can be improved. Note that although the examples of FIGS. 7A to 7C show the cases where the substrate structure of the second embodiment is applied to mobile terminals, it is also possible to apply the substrate structure of the first embodiment which ensures the observationality and controllability by a designer or the like to mobile terminals.

As with the circuit boards of the foregoing first to third embodiments, if the structure is made such that a signal line through which a confidential signal requiring tamper resistance flows and all components associated with the input and output of the confidential signal are contained in an internal layer of the circuit board, it is impossible to probe the signal. However, it is highly likely that a malicious third person may peel or scrape off the surface of the circuit board to expose the components, signal line, and the like contained in the internal layer. To take measures against third parties who peels or scrapes off the surface of the circuit board, it is preferable to provide a component-breaking function to a circuit board. The component breaking function may be provided to a circuit board in the manner described below, for example.

The adhesive strength between a component-containing layer and components associated with the input and output of a confidential signal is made to be greater than the breaking strengths of the components themselves. By this, if there is an attempt to peel off the components from the component-containing layer, the components themselves are caused to be broken.

Alternatively, the adhesive strength between a component-containing layer and components associated with the input and output of a confidential signal is made greater than the connection strength between the components and a signal line (wiring pattern) through which the confidential signal flows. By this, if there is an attempt to peel off the components from the component-containing layer, the electrical connection between the components and the signal line is caused to be interrupted.

Alternatively, a component-containing layer is allowed to have a greater residual stress than the breaking strength of components associated with the input and output of a confidential signal or than the connection strength between the components and a signal line through which the confidential signal flows. Here, the residual stress means a stress remained in the component-containing layer (for example, a force generated upon returning from a bend state). The residual stress maintains a state where the force is being maintained if the component-containing layer has no damage and is released if any damage is caused to the component-containing layer. By this, in the case where the component-containing layer is cut or ground, the components themselves are caused to be broken or the electrical connection between the components and the signal line is caused to be interrupted.

Fourth Embodiment

A fourth embodiment of the present invention describes an apparatus (e.g., a CAD apparatus or the like) for aiding the design of the circuit boards described in the foregoing first to third embodiments. The circuit board design aiding apparatus and method according to the fourth embodiment of the present invention are characterized in that conventional circuit board design aiding apparatuses and methods are allowed to take into account a confidential signal. Note that the conventional circuit board design aiding apparatuses and methods are described in detail in Japanese Laid-Open Patent Publication No. 2000-242674, for example.

Figure 8:
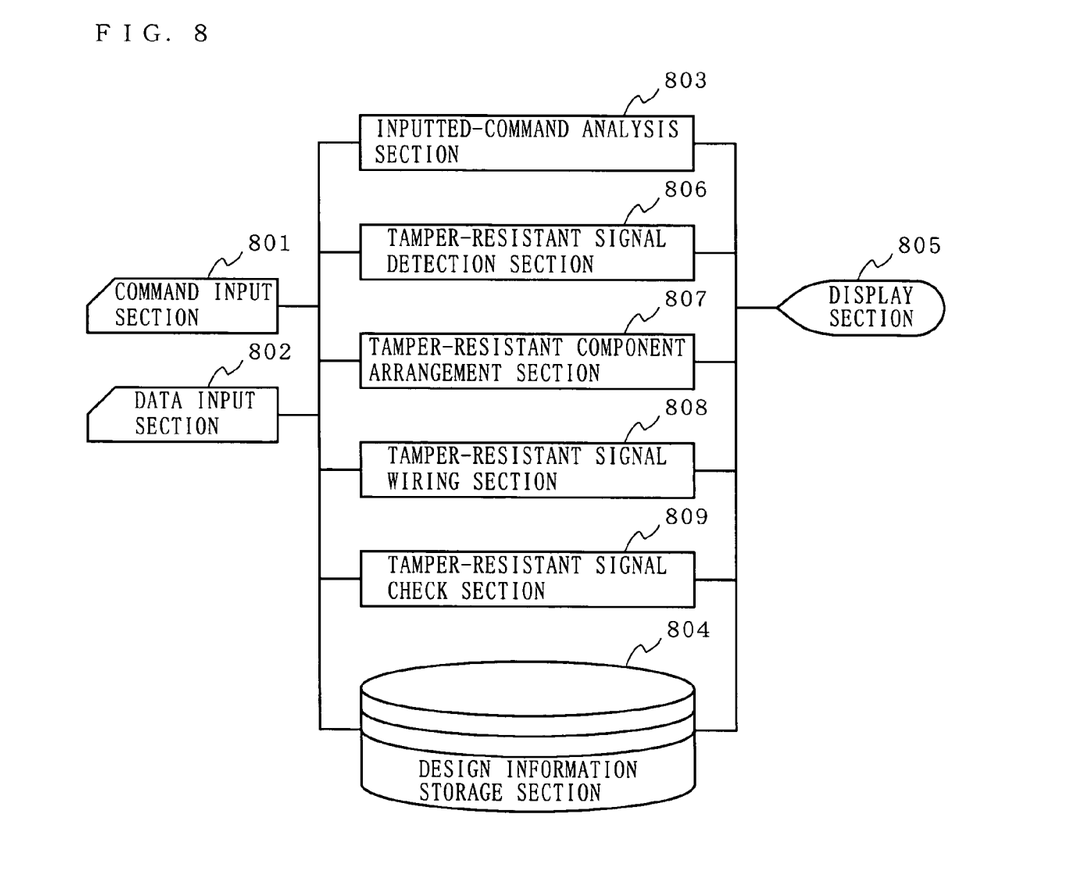
FIG. 8 is a functional block diagram for schematically describing a circuit board design aiding apparatus according to a fourth embodiment of the present invention.

FIG. 8 is a functional block diagram for schematically describing a circuit board design aiding apparatus according to the fourth embodiment of the present invention. In FIG. 8, the design aiding apparatus includes a command input section 801, a data input section 802, an inputted-command analysis section 803, a design information storage section 804, a display section 805, a tamper-resistant signal detection section 806, a tamper-resistant component arrangement section 807, a tamper-resistant signal wiring section 808, and a tamper-resistant signal check section 809.

The command input section 801 is an input interface, such as a keyboard or mouse, and receives various design commands inputted by user operations. Circuit diagram information and the like created by a circuit diagram creation CAD apparatus or the like (not shown) are inputted to the data input section 802. The inputted-command analysis section 803 analyzes a design command inputted to the command input section 801 and determines the type of the inputted command. The design commands include a component arrangement command, a wiring command, and the like. The design information storage section 804 stores design information necessary to design a circuit board, such as circuit diagram information inputted from the data input section 802, substrate information, layer configuration information, component information, connection information, signal information, design reference information, and the like. Information regarding whether a given signal is a confidential signal is included in signal information by, for example, specification of the designer or the like. The display section 805 displays a display screen in accordance with a design process of the circuit board being designed.

For a method of specifying a confidential signal, the designer or the like may specify, one by one, a signal by name such as TCKTDI, TMS, TDO, NRD, and NWT. Alternatively, predetermined spellings such as *CS* and ADR* may be specified, and a signal which contains such spellings may be specified as a confidential signal. Alternatively, a confidential signal may be specified in such a manner that signals contained in a circuit board are divided into groups and one of the groups is provided with an attribute of tamper resistance.

Figure 9:
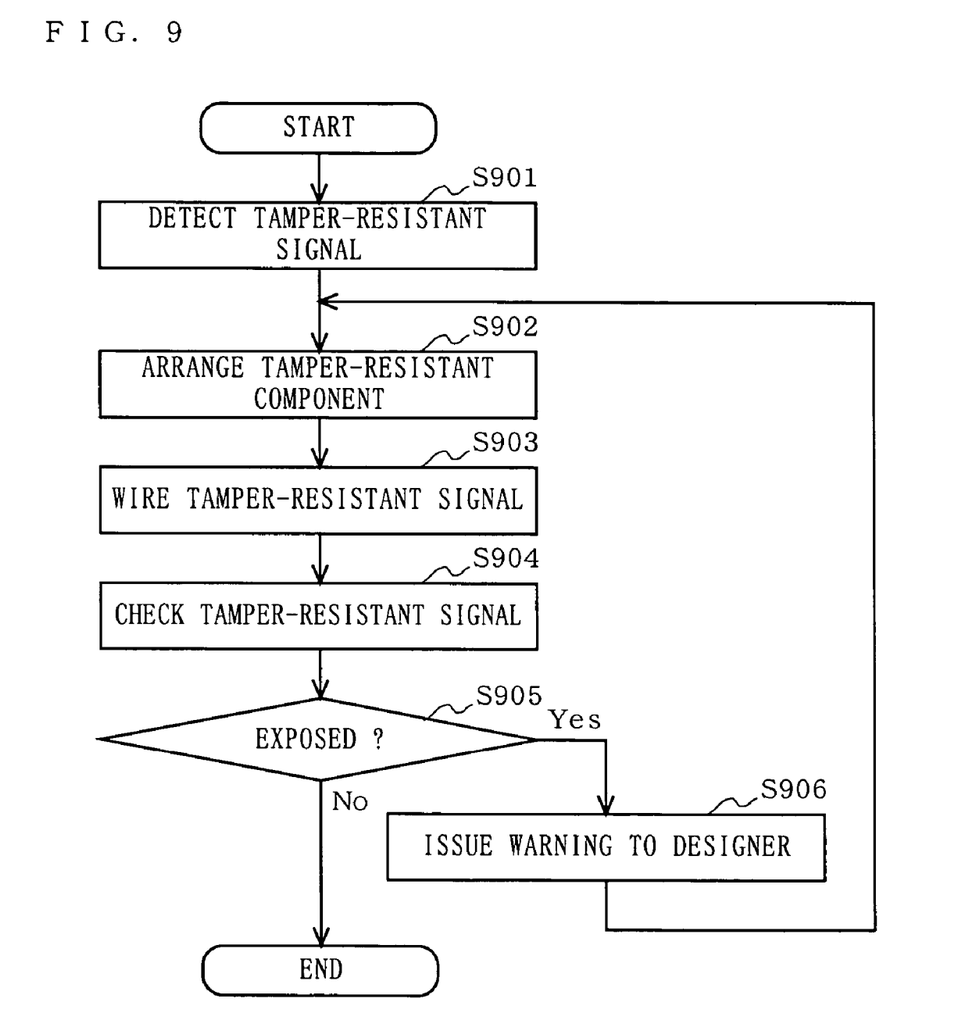
FIG. 9 is a flowchart showing the processing steps of a circuit board design aiding method according to the fourth embodiment of the present invention.

Referring further to FIG. 9, a circuit board design aiding method regarding tamper resistance will be described.

The tamper-resistant signal detection section 806 detects a confidential signal from the signal information stored in the design information storage section 804 (step S901). The tamper-resistant component arrangement section 807 performs a design process of arranging in an internal layer a component having a predetermined package (for example, a component whose terminal is exposed) among components to be connected to the confidential signal detected by the tamper-resistant signal detection section 806, and arranging other components in appropriate regions where the other components are arrangeable (step S902). The component arrangement in the design process may be performed using a method used in conventional CAD apparatuses or may be performed by the designer or the like giving an instruction through the command input section 801. Even if the component is a component whose signal terminal is exposed, if the component comes in a BGA package, a CSP package, or the like, for example, the component may be arranged on the upper or lower surface of the circuit board at the discretion of the designer or the like.

After all components have been arranged by the tamper-resistant component arrangement section 807, the tamper-resistant signal wiring section 808 performs a design process of wiring the confidential signal line only within a region in the internal layer and other lines in appropriate regions where the other lines are arrangeable (step S903). The tamper-resistant signal check section 809 checks on the circuit board having been subjected to the design processes of the tamper-resistant component arrangement section 807 and the tamper-resistant signal wiring section 808, whether the confidential signal is wired only within the internal layer, whether the signal line and components terminals through which the confidential signal flows are not exposed on the surface of the circuit board, and the like (step S904). If any of the component terminals, signal line, via, and the like through which the confidential signal flows is exposed on the surface of the circuit board, a warning is issued to the designer or the like (steps S905 and S906). For a means of issuing a warning, a message may be displayed on the screen of the display section 805, a warning portion may be displayed with highlighting, or a warning may be issued by a sound such as a beep sound. Alternatively, a log may be saved. The designer or the like having received a warning then re-arranges the components or re-wires the signal line (steps S902 to S904 are repeated).

As described above, by using the circuit board design aiding apparatus and method according to the fourth embodiment of the present invention, the circuit boards with improved tamper resistance which are described in the foregoing first to third embodiments can be easily designed. In addition, even if the design has not been made properly, since a warning is issued to the designer or the like, a circuit board design error can be avoided.

While the invention has been described in detail, the foregoing description is in all aspects illustrative and not restrictive. It is understood that numerous other modifications and variations can be devised without departing from the scope of the invention.

What is claimed is:

1. A circuit board comprising:
   a multilayer structure comprising outermost substrates and an internal layer between said outermost substrates, wherein said multilayer structure enables components to be contained in at said internal layer between said outermost substrates; and
   a signal line through which a predetermined confidential signal flows, said signal line wired such that the confidential signal does not appear at an outer surface of said outermost substrates of said multilayer structure of said circuit board.

2. The circuit board according to claim 1, further comprising an external access component configured to connect between said signal line and a predetermined observation point provided on a surface of said circuit board, said external access component being located at said internal layer to allow the confidential signal to be observed and controlled through said external access component.

3. The circuit board according to claim 2, wherein said external access component has an encryption function, and performs a predetermined encryption on the confidential signal and outputs the encrypted confidential signal to the observation point to allow the encrypted confidential signal to be observed and controlled by decoding a cipher provided to the encrypted confidential signal which appears at the observation point.

4. The circuit board according to claim 3, wherein in the case where there are a plurality of confidential signals, the confidential signals are classified by a predetermined classification method and different types of encryption are performed on the classified confidential signals.

5. The circuit board according to claim 4, wherein the encryption function involves a plurality of scrambling engines which are performed in accordance with the number of classifications.

6. The circuit board according to claim 3, wherein the encryption function involves a scrambling engine.

7. The circuit board according to claim 3, wherein said external access component further has a debug function for debugging the components installed in said circuit board, and performs a predetermined encryption on a debug signal for observing and controlling operations of the components and outputs an encrypted debug signal to the observation point.

8. The circuit board according to claim 2, wherein said external access component has a fast interface function which enables a fast sampling of the confidential signal, and compresses the confidential signal and outputs the compressed confidential signal to the observation point.

9. The circuit board according to claim 2, wherein said external access component has an output selection function, to allow selection of one of an output mode and a non-output mode of the confidential signal to the observation point.

10. The circuit board according to claim 9, wherein said external access component is a component selected from the group consisting of a zero ohm resistor and a signal-transmitting component; and the output mode is set by mounting said external access component on said circuit board and the non-output mode is set by dismounting said external access component from said circuit board.

11. The circuit board according to claim 2, wherein said external access component has a debug function for debugging the components installed in said circuit board, and allows selection of one of mounting and dismounting of said external access component.

12. The circuit board according to claim 1, further comprising at least one of a component configured to input the confidential signal and a component configured to output the confidential signal contained at said internal layer.

13. The circuit board according to claim 1, further comprising a component configured to input or output the confidential signal installed in said circuit board with a connection terminal thereof concealed, wherein said component configured to input or output the confidential signal is arranged on a surface of said circuit board by establishing a connection with said signal line through a via.

14. The circuit board according to claim 1, wherein an adhesive strength between said internal layer and one or more components associated with input and output of the confidential signal is greater than a breaking strength of the component.

15. A design aiding apparatus for aiding in a design of a circuit board having a multilayer structure comprising outermost substrates and an internal layer between the outermost substrates, the multilayer structure enabling components to be contained at the internal layer between the outermost substrates, said design aiding apparatus comprising:
   a detection section configured to detect a confidential signal based on predetermined information necessary to design the circuit board;
   an arrangement section configured to arrange at the internal layer a component having a predetermined package among a component configured to input the detected confidential signal and a component configured to output the detected confidential signal, and design a circuit;
   and a wiring section configured to wire a signal line, through which the detected confidential signal flows, at the internal layer such that the confidential signal does not appear on an outer surface of the outermost substrates of the circuit board, and design the circuit.

16. The design aiding apparatus according to claim 15, further comprising a check section configured to check whether the circuit having been designed by said arrangement section and said wiring section is designed in such a manner that the confidential signal does not appear on the outer surface of the outermost substrates of the circuit board, and output a predetermined warning if the circuit is not designed in the manner.

17. The design aiding apparatus according to claim 15, wherein the component having the predetermined package is a component whose connection terminal is concealed when installed in the circuit board.

18. A design aiding method for aiding in a design of a circuit board having a multilayer structure comprising outermost substrates and an internal layer between the outermost substrates, the multilayer structure enabling components to be contained at the internal layer between the outermost substrates, said design aiding method comprising:
   detecting a confidential signal based on predetermined information necessary to design the circuit board;
   arranging at the internal layer a component having a predetermined package among a component configured to input the confidential signal detected during said detecting and a component configured to output the confidential signal detected during said detecting, and designing a circuit;
   wiring a signal line, through which the confidential signal detected during said detecting flows, at the internal layer such that the confidential signal does not appear on an outer surface of the outermost substrates, and designing the circuit;
   checking whether the circuit having been designed by said arranging and said wiring is designed in such a manner that the confidential signal does not appear on the outer surface of the outermost substrates of the circuit board; and
   outputting a predetermined warning if the circuit is determined during said checking not to be designed in the manner.

19. A computer-readable storage medium having stored therein a program to be executed by a design aiding apparatus for aiding in a design of a circuit board having a multilayer structure comprising outermost substrates and an internal layer between the outermost substrates, the multilayer structure enabling components to be contained at the internal layer between the outermost substrates, the program causing the design aiding apparatus to perform a method comprising:
   detecting a confidential signal based on predetermined information necessary to design the circuit board;
   arranging at the internal layer a component having a predetermined package among a component configured to input the confidential signal detected during said detecting and a component configured to output the confidential signal detected during said detecting, and designing a circuit;
   wiring a signal line, through which the confidential signal detected during said detecting flows, at the internal layer such that the confidential signal does not appear on an outer surface of the outermost substrate, and designing the circuit;
   checking whether the circuit having been designed by said arranging and said wiring is designed in such a manner that the confidential signal does not appear on the outer surface of the outermost substrates of the circuit board; and outputting a predetermined warning if the circuit is determined during said checking not to be designed in the manner.

20. A portable mobile terminal comprising a circuit board and an interface to be connected to said circuit board; wherein said circuit board comprises:
   a multilayer structure comprising outermost substrates and an internal layer between said outermost substrates, said multilayer structure enabling components to be installed at said internal layer;
   a component configured to perform communication processing;
   one or more components configured to handle a predetermined confidential signal; and
   a signal line through which the confidential signal flows, said signal line wired such that the confidential signal does not appear on an outer surface of said outermost substrates of said multilayer structure of said circuit board.

21. The mobile terminal according to claim 20, further comprising a non-contact communication processing section configured to send and receive the confidential signal by non-contact communication, wherein said components configured to handle the confidential signal sent and received by said non-contact communication processing section are arranged at said internal layer of said circuit board, and said signal line is wired so as to be contained at said internal layer of said circuit board.

* * * * *